United States Patent [19]

Thaniyavarn

[11] Patent Number: 5,729,642
[45] Date of Patent: Mar. 17, 1998

[54] N×N OPTICAL SWITCH ARRAY USING ELECTRO-OPTIC AND PASSIVE WAVEGUIDE CIRCUITS ON PLANAR SUBSTRATES

[75] Inventor: Suwat Thaniyavarn, Bellevue, Wash.

[73] Assignee: The Boeing Company, Seattle, Wash.

[21] Appl. No.: 538,143

[22] Filed: Oct. 2, 1995

[51] Int. Cl.$^6$ .................................................... G02B 6/26
[52] U.S. Cl. .............................. 385/17; 385/14; 385/15; 385/16; 385/24; 385/40; 385/132
[58] Field of Search .............................. 385/14, 15, 16, 385/17, 20, 22, 25, 27, 40, 41, 49, 50, 129, 130, 132

[56] References Cited

U.S. PATENT DOCUMENTS

| | | | |
|---|---|---|---|
| 4,458,143 | 7/1984 | Yamada et al. | 385/17 X |
| 4,630,883 | 12/1986 | Taylor et al. | 385/17 X |
| 4,653,849 | 3/1987 | Boirat et al. | 385/17 X |
| 4,653,850 | 3/1987 | Boirat et al. | 385/17 X |
| 4,671,605 | 6/1987 | Soref | 385/15 X |
| 4,695,121 | 9/1987 | Mahapatra | 385/14 X |
| 4,696,059 | 9/1987 | MacDonald et al. | 385/15 X |
| 4,764,738 | 8/1988 | Fried | 342/376 X |
| 4,789,214 | 12/1988 | Vilhelmsson et al. | 385/17 X |
| 4,846,542 | 7/1989 | Okayama et al. | 385/17 X |
| 4,859,022 | 8/1989 | Opdahl | 385/15 X |
| 4,903,029 | 2/1990 | Newberg et al. | 342/172 |
| 4,932,735 | 6/1990 | Koai | 385/14 X |
| 5,009,477 | 4/1991 | Alferness et al. | 385/17 X |
| 5,013,113 | 5/1991 | Soref | 385/15 X |
| 5,048,910 | 9/1991 | Caron | 385/17 |
| 5,050,951 | 9/1991 | Caron et al. | 385/17 |
| 5,050,955 | 9/1991 | Sjolinder | 385/17 |
| 5,101,455 | 3/1992 | Goutzoulis | 385/24 |
| 5,103,495 | 4/1992 | Goutzoulis | 385/15 |
| 5,109,449 | 4/1992 | Newberg et al. | 385/46 |
| 5,125,051 | 6/1992 | Goutzoulis et al. | 385/271 |
| 5,175,777 | 12/1992 | Bottle | 385/17 |
| 5,181,134 | 1/1993 | Fatehi et al. | 359/117 |
| 5,233,453 | 8/1993 | Sivarajan et al. | 359/117 |
| 5,253,310 | 10/1993 | Delbare et al. | 385/14 |
| 5,255,332 | 10/1993 | Welch et al. | 385/17 |

Primary Examiner—Brian Healy
Attorney, Agent, or Firm—Mary Y. Redman, Esq.

[57] ABSTRACT

An optical switching network includes one or more planar substrates with an optical waveguide switching array formed thereon butt-coupled to a waveguide component. The waveguide component is a planar substrate with a plurality of passive optical waveguides thereon. The input ends and output ends of the waveguides are disposed along the butt-coupled edge(s) of the waveguide component substrate. The waveguides and switches are arranged with the waveguides interconnecting the input and output switch arrays so that an incoming optical signal can be directed to any desired output on the output array. The use of planar substrates with electro-optic and passive waveguide circuits allows for a modular approach, where the active switch array substrate and the passive waveguide substrates can be optimized individually. An N×N switch array circuit can be formed of N sets of N×1 switch arrays on the input substrate and N sets of N×1 switch arrays on the output substrate. The input and output switch arrays are then interconnected by butt-coupling to a passive waveguide array fabricated on another substrate to form a complete N×N switch array circuit.

26 Claims, 2 Drawing Sheets

N×N OPTICAL SWITCH ARRAY USING ELECTRO-OPTIC AND PASSIVE WAVEGUIDE CIRCUITS ON PLANAR SUBSTRATES

FIELD OF THE INVENTION

This invention is in the field of photonic switching devices and integrated electro-optic devices.

BACKGROUND OF THE INVENTION

The "Information Superhighway" has been a much discussed topic as the potential benefits of large telecommunication networks with high speed data links are contemplated. Utilization of fiber optics in such networks would offer many advantages. Fiber optics are an attractive alternative for distribution of both digital and analog signals in other applications because of their extremely broad bandwidth, low loss, reduced weight and bulk, and immunity to electromagnetic interference (EMI) and electromagnetic pulse (EMP). But their use in large networks (for example, as telecommunication data links) is severely limited by difficulties in switching and signal routing. Circuit switching and signal routing is typically accomplished with electronic switches. Where electronic switches are used in combination with a fiber optic network, optical-to-electrical and electrical-to-optical signal conversions are necessary. These conversions introduce bandwidth limitations, conversion losses, and signal degradation.

It would be desirable to accomplish the signal routing and reconfiguration directly in the optical domain to eliminate the performance problems presented by optical/electrical conversions. However, a practical, low cost, high performance optical switch array has not yet been implemented. While many architectural layouts for switch arrays could be fabricated as an integrated optical waveguide circuit on an electro-optic material such as Lithium Niobate, most are extremely difficult to expand to large array dimensions because of waveguide cross talk, substrate real estate limitations, and fabrication difficulties. Many architectures require signal paths to cross one another. Waveguide cross-overs in a large array would introduce unacceptable losses and cross-talk. They also would require complicated switching algorithms and a large substrate size which makes them difficult to fabricate and implement.

The switch array architecture popularly called the binary tree architecture (also known as the router-selector) is desirable because it does not require waveguide cross-overs, has a strictly non-blocking property and requires only a simple switch array control algorithm. However, even this architecture has not heretofore achieved practical implementation for a large switch array because it requires a large number of optical interconnections. With current technology, these are done with optical fibers. This approach has serious drawbacks for an array of any appreciable size. Connecting the optical fibers to the switch arrays is tedious, time consuming and incompatible with low cost mass production. Alignment difficulties and insertion losses are formidable problems inherent in this approach. A diameter of a single mode optical waveguide in both Lithium Niobate and glass fiber is typically on the order of 3 to 9 microns. To get low coupling loss between the fiber and the waveguide, their centers must be aligned to within much less than 1 micron. But, the fibers are typically epoxied in a silicon V-groove, and epoxy cannot be applied in a layer of consistent thickness. Also, commonly available optical fibers at best have about 1 micron error in concentricity and size. Obviously, alignment errors will be numerous and commonplace. These alignment errors result in higher coupling losses which are extremely difficult if not impossible to overcome, particularly for a large array.

Another problem in interfacing optical fibers to an optical switch array is the fragility and size of the resulting device. Because a typical diameter of a single mode optical fiber is about 125 microns, the fibers should not be packed closer than about 150 microns, center-to-center. In fact, a 250 micron center-to-center fiber spacing is commonly used. For an N×N array, $N^2$ optical fibers are required. Obviously, the lateral dimensions required to accommodate the optical fibers are quite large. Furthermore, since the minimum bending radius for optical fiber is typically a few centimeters, there are serious constraints in packing density, and considerable difficulties in assembling the large number of optical fiber loops which would be required to package the assembly. The fragility of the optical fibers is also a matter of great concern.

It is apparent that a more easily manufactured, low cost approach to optical switch implementation is needed.

SUMMARY OF THE INVENTION

The present invention is a practical, compact and easily manufactured N×N switch array device. An optical switching network according to one embodiment of the invention includes two switching components butt-coupled to opposite sides of an interconnecting waveguide component. Each switching component is a planar substrate with an optical waveguide switch array formed thereon. Alternately, two separate switch arrays can be fabricated on a single substrate. The waveguide component is a second planar substrate with optical waveguides having their input ends and output ends disposed along the butt-coupled edges of the second substrate. The waveguides and switches are arranged so that an input to the first switch component can be directed to a selected output line. In a preferred embodiment, a binary tree switch configuration is used. The use of planar substrates allows simple, low loss and low cost assembly of N×N switch arrays via butt-coupling of the two sets of waveguide array at the same time, in one step, instead of aligning each waveguide-to-waveguide coupling individually. The use of planar substrates with electro-optic and passive waveguide circuits allows for a modular approach, with interchangeable switching and waveguide components chosen for a particular application.

Using planar waveguide technology such as silica-on-silicon technology, a much denser and thus more compact waveguide circuit can be achieved than by using optical fibers. Planar waveguide technology allows a much smaller waveguide-to-waveguide spacing than that which can be achieved using optical fibers; it also allows low loss small-radius waveguide bends, which facilitate greater packaging density. Furthermore, planar optical waveguides can cross each other with very low loss and low crosstalk. This particular feature cannot be achieved with optical fibers. Unlike an optical fiber array, entire planar waveguide circuits can be fabricated at the same time using standard semiconductor micro-fabrication technique. Precise waveguide positions are also defined by standard photolithographic technique.

The substrate on which the switch array is formed is preferably a material with an efficient electro-optic effect, such as $LiNbO_3$, with the integrated electro-optic switches formed by a process such as titanium indiffusion or proton exchange optical waveguide techniques. The substrates with waveguide arrays are preferably materials suitable for low propagation loss, such as silica waveguides fabricated on silicon substrates. The use of these planar substrates and integrated optics provides devices which are compact, easily fabricated and highly reliable. Waveguides can be fabricated and the entire waveguide patterns can be precisely defined by standard photolithographic techniques, which assures the proper alignment of waveguides in the butt-coupled substrates, since the correct relative placement of waveguides is assured by this fabrication technique. Since all waveguides are fabricated on planar surfaces, they are automatically aligned on the same plane as well.

The present invention allows a modular approach to switch array implementation. The switch array component and the waveguide component can be optimized individually, and can be interchangeably coupled to create a switch array as desired, since they can be fabricated as independent modules. Thus, the devices of the present invention are well-suited to mass-production and yet still are quickly and easily adapted for particular applications.

DETAILED DESCRIPTION OF THE DRAWINGS

Figure 1:
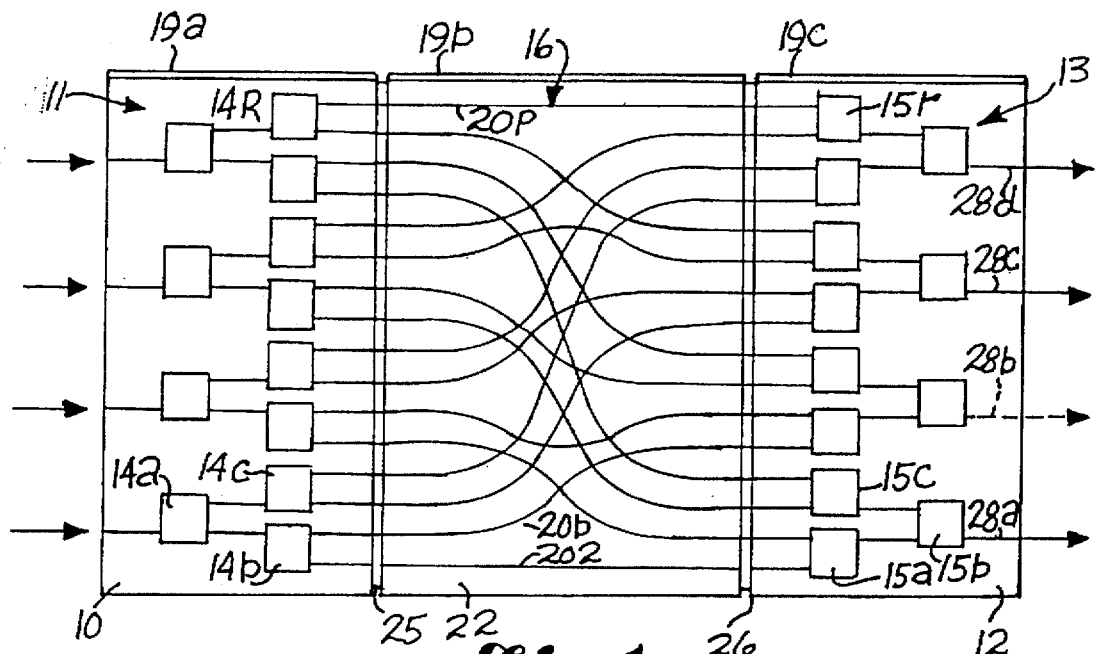
FIG. 1 is a schematic representation of a first embodiment of the invention.

Referring to FIG. 1, a first embodiment of the invention includes a first substrate 10 having an array of electro-optic switches 14a, 14b ... 14l formed thereon. This first substrate 10 with switches 14a, 14b ... 14l is preferably formed as an integrated optic switch circuit 11 fabricated on an electro-optic substrate. A second substrate 12 with a switch circuit 13 made up of an array of switches 15a, 15b ... 15l which is preferably a mirror image of the array on the first substrate 10 is also provided. Preferably, the substrate material will be one which has low optical waveguide propagation loss, high electro-optic efficiency, and an optical waveguide mode size that is easily matched to the mode size of the other optical waveguide substrates which are discussed below. Lithium Niobate (LiNbO$_3$) is very well-suited to this application insofar as it exhibits these properties and also is easy to work with in the fabrication processes used to manufacture the device. Lithium tantalate is another example of a material suitable for use in the present invention. As illustrated, the switching circuit 11 is the input switch array and the circuit 13 is the output switch array.

The switches 14a, 14b ... 14l and 15a, 15b, ... 15l are preferably electro-optic 1×2 or 2×2 directional coupler waveguide switches arranged in a binary tree structure. Use of a material like LiNbO$_3$ allows for the use of highly efficient, very high speed and low cross talk (less than −30 dB) waveguide switches. Such a switch is described in the Springer-Verlag Series on Electronics and Photonics, Volume 26, "Guided-Wave Optoelectronics," (T. Tamir, editor) which is incorporated herein by reference. The switches may be fabricated by well-known processes such as titanium indiffusion or proton exchange. Input and output waveguides for each switch are provided as shown.

In the embodiment of FIG. 1, the substrates 10 and 12 butt-couple to opposite sides of a waveguide component 16. Waveguide component 16 includes a substrate 22 having a plurality of waveguides 20a, 20b ... 20p formed thereon. Any material on which low loss optical waveguides can be formed will be usable for this substrate 22. Preferably, the material will be one which allows for very low loss waveguides having small bend radii. The waveguide mode should match well that of the first substrate. Silica waveguides fabricated on a silicon substrate have these properties. Thus, in a preferred embodiment, waveguides 20a ... 20p on the substrate 22 are passive, low loss optical waveguides, such as silica waveguides on silicon or quartz, etc., wafer.

In the FIG. 1 embodiment, each of the waveguides 20a, ... 20p on substrate 22 has its two ends disposed on opposite edges 25, 26 which are butt-coupled to the switch circuits 11 and 13. Proper alignment of the butt-coupled substrates can be assured by the provision on each substrate of an alignment waveguide 19a, 19b, 19c positioned to be collinear when the substrates are properly aligned.

The waveguides and switches in this embodiment are arranged in a binary tree architecture so that any input to the switch circuit 11 can be directed to any desired output waveguide 28a, 28b, 28c, and 28d. For purposes of illustration, a 4×4 array has been shown but one having ordinary skill in the art can expand the array to any desired size.

Figure 2:
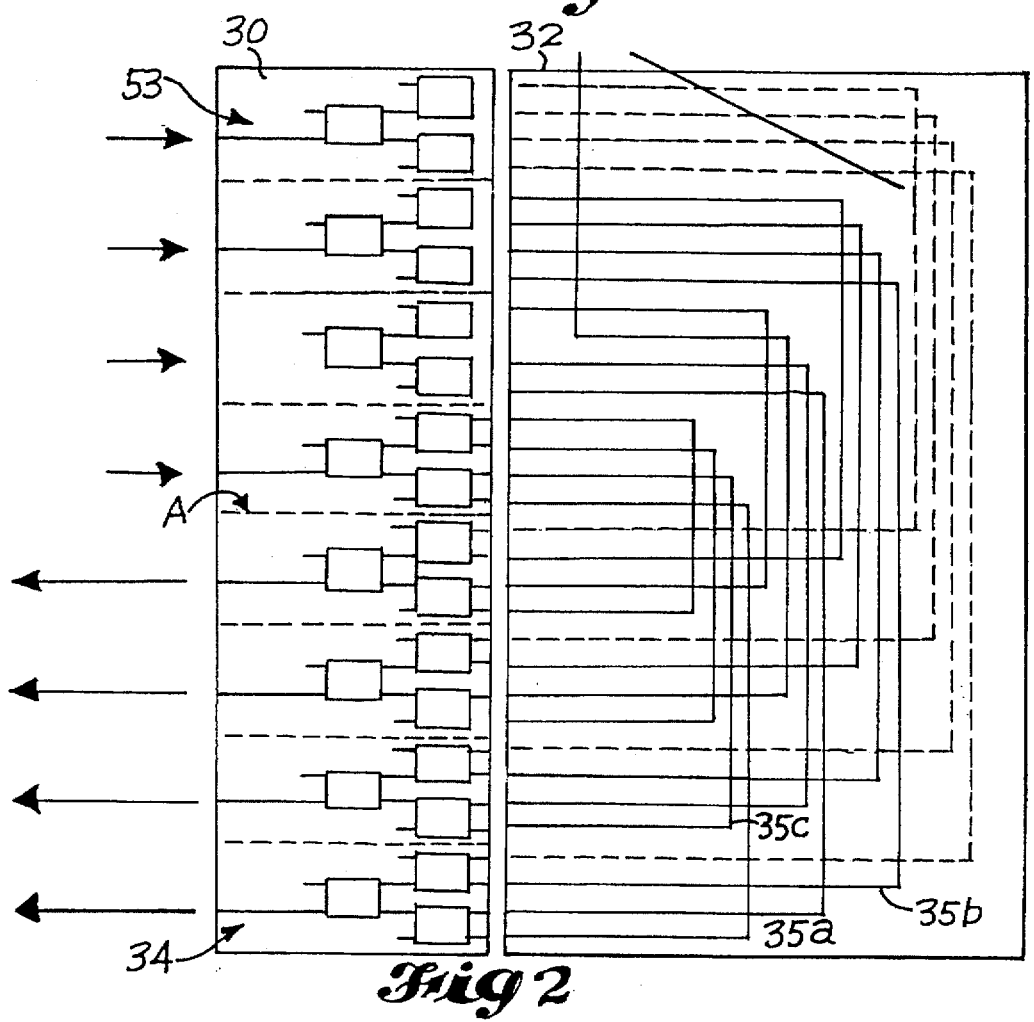
FIG. 2 is a schematic representation of a second embodiment of the invention.

FIG. 2 shows a second embodiment of the invention. For illustrative purposes, a 4×4 switching array device is shown. In this embodiment, a first substrate 30 is butt-coupled to a second substrate 32. The first substrate 30 is preferably a material such as LiNbO$_3$ on which a switch array is provided. The second substrate 32 is preferably a material such as silicon on which silica waveguides 35a, 35b, 35c ... are formed. Two sets of four 1×4 optical switch arrays are used: an input network 33 for the optical input to the silica waveguide lines and an output network 34 for the output. Phantom line A delineates the input switch array and output switch array.

In the illustrated embodiment, an input optical signal on any one of four input waveguides can be routed to any one of 4 output waveguide lines through the input switch network 33, and the output switch array 34. An advantage of this approach is that only one LiNbO$_3$/silica waveguide interface must be created by butt-coupling in one single step. This will reduce the cost of fabrication as well as assembly of the components together by as much as a factor of two. This approach can be expanded to a larger N×N array by means which will be apparent to one having ordinary skill in the art.

Figure 3:
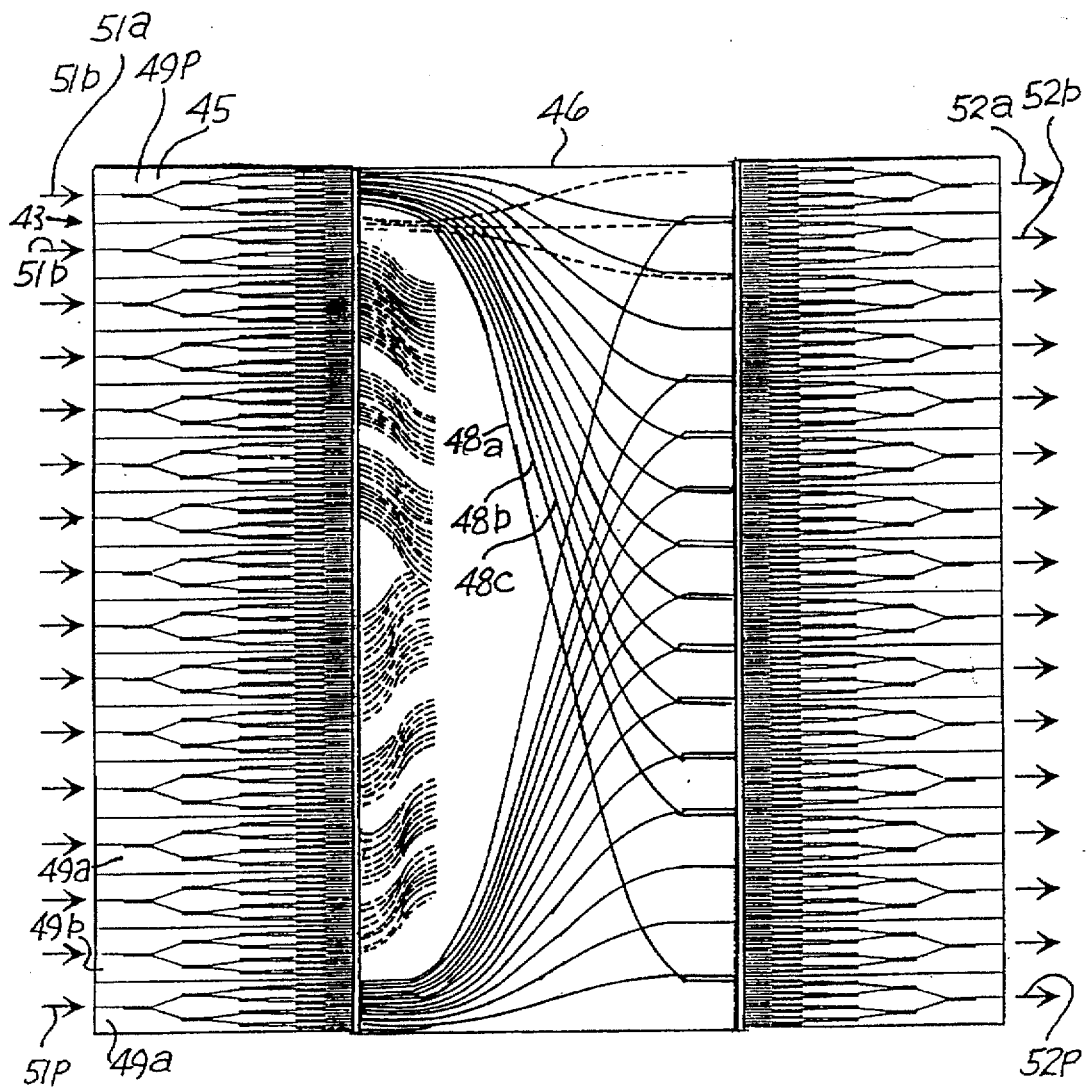
FIG. 3 is a schematic representation of an embodiment of the invention, of larger dimensions, i.e., a 16×16 switch array.

FIG. 3 shows a third embodiment, in which the basic architecture of FIG. 1 is expanded to larger dimensions. This embodiment includes a LiNbO$_3$ substrate 45 with a switching array 43 composed of sixteen binary tree 1×16 switching matrices 49a, 49b, ... 49p thereon. This substrate 45 is butt-coupled along one edge to a silicon substrate 46, with waveguides 48a, 48b, 48c, ... respectively, thereon. For illustrative purposes, only a few of the 256 waveguides are shown. It will be understood that any one of the sixteen inputs 51a, 51b, ... 51p can be routed to any one of the sixteen outputs 52a, 52b, ... 52p through the binary tree switch arrays. Alignment waveguides (not shown) may be provided, similar to those in the FIG. 1 embodiment.

Silica waveguides can cross one another, can be made with very small bending radii (about 5 mm) and can be spaced less than 50 microns apart. Thus, this device can be made quite compact. Fabricating all the waveguides on planar substrates with precise photolithographic techniques ensures that the waveguides are automatically aligned on the same plane. Precise alignment of the entire array of waveguides and the switches can thus be assured. Appropriate anti-reflection coatings such as yttrium oxide can be placed on the input and output edges of the substrates. To minimize mode mismatch, the cross section of the waveguides can be tailored to match the profile of the $LiNbO_3$ waveguides which input or output signals to or from the switches. The coating and the mode matching reduce losses at the substrate interfaces.

The invention lends itself to a modular approach for adapting the device to specific applications. In any of the illustrated embodiments, each component substrate can be independently optimized and treated as interchangeable modules. Thus, one could choose from a collection of switch and waveguide components of differing configurations to easily assemble a device tailored for a particular need.

It will be understood that the embodiments described above are merely illustrative and that persons skilled in the art may make many variations and modifications, including combinations of various features of the illustrated embodiments, without departing from the spirit and scope of the invention. All such modifications and variations are intended to be within the scope of the invention as defined in the appended claims.

What is claimed is:

1. An optical switching device comprising:
   a switching component comprising a first planar substrate, with a first optical waveguide switching array comprising integrated optical switches formed on said first substrate;
   a waveguide component comprising a second planar substrate butt-coupled co-planar to said first substrate with a plurality of optical waveguides formed on said second substrate, the input ends of said waveguides being disposed along the edge of said second substrate which is butt-coupled co-planar to said first substrate;
   said switching array being coupled co-planar to said input ends of said plurality of waveguides to direct an optical signal through a selected one or more of said waveguides.

2. An optical switching device comprising:
   a switching component comprising a first planar substrate, with a first optical waveguide switching array comprising integrated optical switches formed on said first substrate;
   a waveguide component comprising a second planar substrate butt-coupled to said first substrate with a plurality of optical waveguides formed on said second substrate;
   the input ends of said waveguides being disposed along the edge of said second substrate which is butt-coupled to said first substrate;
   said switching array being coupled to said input ends of said plurality of waveguides to direct an optical signal through a selected one or more of said waveguides; and
   a third planar substrate with a second optical waveguide switching array comprising integrated optical switches formed thereon, and wherein the output ends of said waveguides are disposed along an edge of said second substrate which is butt-coupled to said third substrate, with said second switching array coupled to said output ends of said plurality of waveguides.

3. The device of claim 2 wherein said first optical waveguide switching array comprises N sets of 1×N waveguide switch arrays coupled to the input ends of said waveguides, and said second switching array comprises N sets of N×1 switch arrays coupled to the output ends of said waveguides.

4. The device of claim 3 wherein each of said 1×N and N×1 switch arrays is configured in a binary tree architecture.

5. The device of claim 1 wherein said first substrate comprises an electro-optic material.

6. The device of claim 5 wherein said waveguide component comprises a substrate on which optical waveguides are formed.

7. The device of claim 6 wherein said switching array comprises means for applying a controlled amount of voltage to selected switches in said switching array so as to determine the path through said switching array to be taken by said signal.

8. An optical switching device comprising:
   a switching component comprising a first planar substrate, with a first optical waveguide switching array comprising integrated optical switches formed on said first substrate, said first substrate comprising a $LiNbO_3$ substrate;
   a waveguide component comprising a second planar substrate butt-coupled to said first substrate with a plurality of optical waveguides formed on said second substrate, said second substrate comprising a silicon substrate and said waveguides comprising silica waveguides;
   the input ends of said waveguides being disposed along the edge of said second substrate which is butt-coupled to said first substrate;
   said switching array being coupled to said input ends of said plurality of waveguides to direct an optical signal through a selected one or more of said waveguides.

9. The device of claim 8 further comprising an anti-reflective coating on said second substrate along the edge which is butt-coupled to said first substrate.

10. The device of claim 8 wherein said switches are formed by titanium indiffusion.

11. The device of claim 8 wherein said switches are formed by proton exchange.

12. The device of claim 1 wherein said switching component and said waveguide component are fabricated by photolithography, whereby alignment of waveguides in the switching array component and the waveguide component is facilitated.

13. The device of claim 6 wherein said switching array and said waveguides are fabricated to be co-planar when said first substrate and said second substrate are butt-coupled.

14. An optical switching device comprising:
   a switching component comprising a first planar substrate, with a first optical waveguide switching array comprising integrated optical switches formed on said first substrate;
   a waveguide component comprising a second planar substrate butt-coupled to said first substrate with a plurality of optical waveguides formed on said second substrate, the input ends of said waveguides being disposed along the edge of said second substrate which is butt-coupled to said first substrate, wherein the distances between adjacent waveguides are less than 50 microns;
   said switching array being coupled to said input ends of said plurality of waveguides to direct an optical signal through a selected one or more of said waveguides.

15. An optical switching device comprising:

a switching component comprising a first planar substrate, with a first optical waveguide switching array comprising integrated optical switches formed on said first substrate;

a waveguide component comprising a second planar substrate butt-coupled to said first substrate with a plurality of optical waveguides formed on said second substrate, the input ends of said waveguides being disposed along the edge of said second substrate which is butt-coupled to said first substrate;

said switching array being coupled to said input ends of said plurality of waveguides to direct an optical signal through a selected one or more of said waveguides; and said waveguides having a small bend radii.

16. The device of claim 15 further comprising waveguide crossing structures.

17. The device of claim 1 wherein said switching component further comprises a second optical waveguide switching array formed on said first substrate, and wherein the output ends of said waveguides are disposed along the butt-coupled edge of said second substrate, said second switching array being coupled to said output ends of said waveguides.

18. An optical switching device comprising:

a waveguide component comprising a first planar substrate, with a plurality of optical waveguides formed on said first substrate said waveguides having an input and an output on a single edge; and a switching component butt-coupled co-planar to said waveguide component, said switching component comprising a second substrate with a first optical switching array coupled to the input of said waveguides and a second optical switching array coupled to the output of said waveguide.

19. A modular optical switching network comprising:

at least one electro-optical switching component; and at least one waveguide component coupled co-planar to said electro-optical switching component.

20. A modular optical switching network as claimed in claim 19, wherein said electro-optical switching component comprises a first planar substrate, with a first optical waveguide switching array comprising integrated electro-optical switches formed on said first substrate.

21. A modular optical switching network as claimed in claim 20, wherein said first substrate comprises an electro-optic material with an efficient electro-optic effect.

22. A modular optical switching network as claimed in claim 21, wherein said electro-optic material is $LiNbO_3$.

23. A modular optical switching network as claimed in claim 21, wherein said electro-optic material is lithium tantalate.

24. A modular optical switching network as claimed in claim 19, wherein said second planar substrate comprises a passive waveguide component, with a plurality of passive waveguide circuits formed on said second substrate.

25. A modular optical switching network as claimed in claim 24, wherein said passive waveguide circuits and said second substrate comprise low propagation loss materials.

26. A modular optical switching network as claimed in claim 25, wherein said low propagation loss materials are silica waveguides fabricated on silicon substrates.

* * * * *